F. C. MILLER.
Cigar-Mold.
No. 6,662. Reissued Sept. 28, 1875.
Fig. 1
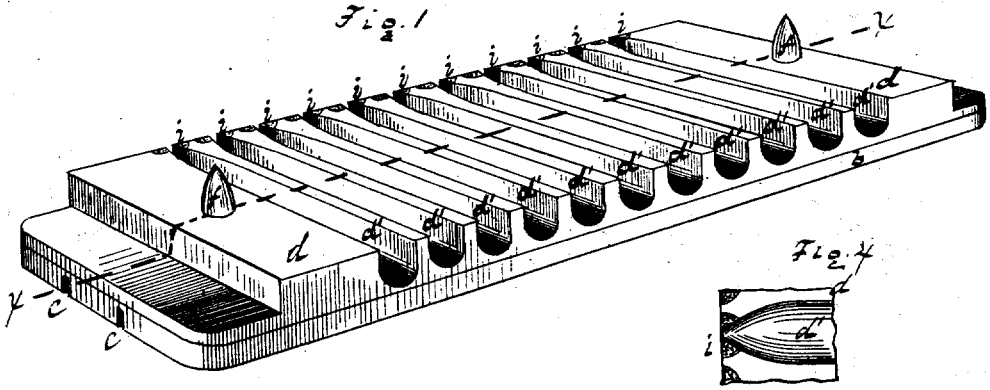
Fig. 4
Fig. 2
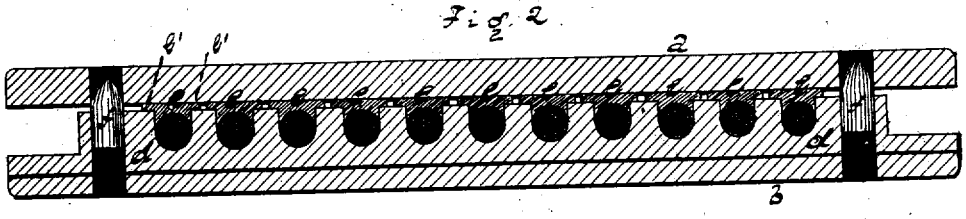
Fig. 3
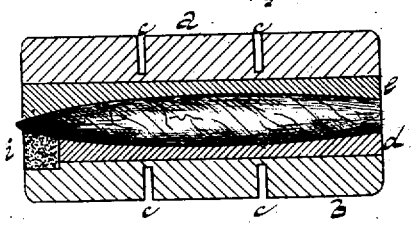
Fig. 5
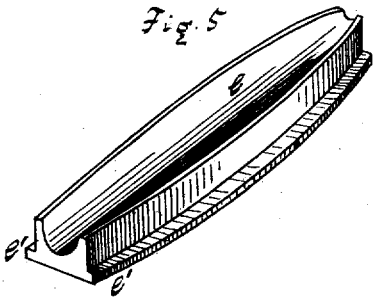
ATTEST
John Pollitt
D. S. Bill
INVENTOR
Fredrick C. Miller
By W. E. Simmons Atty
N. PETERS, PHOTO-LITHOGRAPHER, WASHINGTON, D. C.

UNITED STATES PATENT OFFICE.

FREDRICK C. MILLER, OF CINCINNATI, OHIO.

IMPROVEMENT IN CIGAR-MOLDS.

Specification forming part of Letters Patent No. 155,806, dated October 13, 1874; reissue 6,662, dated September 28, 1875; application filed May 25, 1875.

*To all whom it may concern:*

Be it known that I, FREDRICK C. MILLER, of Cincinnati, in the county of Hamilton and State of Ohio, have invented certain new and useful Improvements pertaining to Cigar-Molds, of which the following is a specification, reference being had to the accompanying drawings, where—

Figure 1 is a perspective view of the lower half or part of a cigar-mold embodying my said invention. Fig. 2 is a view, in longitudinal section on the plane *x x*, of the two halves or parts of the mold closed together. Fig. 3 is a view, in cross-section, of the two halves or parts of the mold closed together, inclosing a cigar. Fig. 4 is a top or plan view of the small end of one of the sockets of the lower half or part of the mold. Fig. 5 is a perspective view of one of the cups belonging to the upper half or part of the mold.

This invention relates to that class of cigar-molds which are capable of pressing a number of cigars at one operation, and are composed essentially of two half-molds, one half provided with a series of connected or fixed plungers or cups fitting a corresponding series of cavities or sockets in the other half in such a manner that when the plungers or cups are forced home into the sockets, the inclosed space will be circular in cross-section. The plungers or cups of the upper or movable half-mold are formed separately, and subsequently secured to the backing, while in the sockets in the lower or stationary half-mold, in order to obtain a perfect register between the cups and the sockets, heretofore the cups have been made of the same width, or nearly so, from top to bottom—that is to say, the width at the top at a particular point would be the same, or nearly so, as the width at the bottom at this same point, and the face of the backing to which they are attached checked their further entrance into the sockets by bringing up against the top of the socket-board. By reason of this construction of the cups it was exceedingly difficult to secure the backing to it without injuring the cups or the surfaces of the sockets by forcing the cups too far into the sockets, and, in case the cups were secured by gluing, either their backing would glue onto the top of the socket-board, or else it had to be withdrawn before the cups had been properly secured. To avoid these difficulties is the object of the first part of my invention, which consists in providing the plungers or cups with laterally-projecting flanges, by means of which they are supported on top of the socket-piece while in the sockets, so that the backing may be brought down upon them with any requisite force to secure them without danger of injuring the molds proper, and which also serve to form a space between their backing and the socket-board, so that, in gluing, the backing may be held clamped to the cups for any length of time necessary to make a permanent and reliable connection.

The second part of my invention consists of a feature of construction calculated to improve the durability of the lower or stationary half-mold. This half-mold is constructed of two pieces of wood, the lower one of which has the grain running in the direction of its length, and the upper of which (or the lower half of the mold proper) has the grain running in the direction of its width, and the direction of the length of the sockets formed in it. Now, to produce the cigar-shaped cavities, the insides of these sockets must converge rather abruptly from their widest distance apart to a small opening at one end; and, as the grain runs with the length of the socket, the wood is liable to split off at this point. To remedy this defect I remove the wood of the socket at this point and introduce a properly-shaped plug or piece of wood having the grain running vertically.

The letter *a* denotes the back-board of the upper or male half of the mold, and *b* the back-board of the lower or female half of the mold. Both are, by preference, of soft wood, having the grain running in the direction of the length, and provided with the saw-cuts *c* to prevent warping. The letter *d* denotes a socket-board of hard or other suitable wood, its grain running transversely of its length, and united to the back-board *b*, preferably by gluing. In it are the female socket *d'*, wherein the cigars are laid when they are to be shaped. The letters *e* denote a series of male cups, of hard wood, which are united to the back-board *a*, preferably by gluing. These male cups *e* fit into the female cups *d'*, as shown in Fig. 2. The cups *e* are made singly and separate from the back-board *a*, for the reason that it is very difficult and very expensive to make them of one piece, and at the same time make the whole set or series fit accurately to the corresponding female sockets underneath, while, by making them singly, I make them cheaply, and then by laying them one by one into the female sockets *d'*, and, while in such position, gluing or otherwise uniting the back-board *a* to them, I secure a fitting and correspondence of the two sets of sockets or cups that is absolutely unattainable in any other manner. Not only this, but if one of the cups *e* be accidentally broken, I can at once, and in an inexpensive manner, replace it; while, if the whole were in one piece, and then one of these cups were to be broken, the whole series would become practically worthless. In furtherance of this object, I make each cup *e* with flanges or shoulders *e'*, which gives each cup the broadest practicable base to stand on, yet leaves space between the cups for the attainment of the nice adjustment, with reference to the socket *d'*, which I have spoken of. The grain of the wood of these cups runs, by preference, in the direction of their length, and transversely of the length of the back-board *a*. When the shoulders *e'* fit down upon the socket-board *d*, as shown in Fig. 2, the spaces between the faces of the sockets *d'* and cups *e* are circular, in cross-section, and fitted to give the proper cylindrical shape to the cigars. Further, the flanges *e' e'* on the cups enable me to make the molds properly rounded in cross-section without altering the depth of either the male or female cups, by simply making the male cups with thinner or thicker flanges, as the case may require. The letters *i* denote pillar-pieces of hard or other suitable wood, with the grain running vertically, glued or otherwise secured in place of the wood of the socket-board removed therefrom by means of an auger-bit, or otherwise, for the purpose of counteracting any tendency of the wood of the socket-board to split out at these points. The letters *f f* denote guide-pins on the face of the socket-board *d*, which run into corresponding holes in the board *a*, and, as the two parts of the mold are closed together, guide the cups *e* into the sockets *d'*.

I claim as my improvements and as my invention—

1. The series of cups *e*, which are constructed with flanges *e'* and attached to a suitable backing, substantially as and for the purposes specified.

2. The movable half-mold, composed of a series of cups, *e*, which are constructed with flanges *e'* and attached to a backing, in combination with the stationary half-mold, having a corresponding series of sockets, *d'*, substantially as and for the purpose specified.

3. In combination with the sockets *d'*, the upright pieces *i*, constructed and designed for use substantially in the manner and for the purpose set forth.

FREDRICK C. MILLER.

Witnesses:
HENRY C. PETERS,
GEORGE H. HIGH.